US012583187B2

(12) United States Patent
Funada et al.

(10) Patent No.: US 12,583,187 B2
(45) Date of Patent: Mar. 24, 2026

(54) BELT MOLDING MANUFACTURING METHOD

(71) Applicant: TOKAI KOGYO CO., LTD., Obu (JP)

(72) Inventors: Kazuhiro Funada, Obu (JP); Yoshiki Nukaya, Obu (JP)

(73) Assignee: TOKAI KOGYO CO., LTD., Obu (JP)

( * ) Notice: Subject to any disclaimer, the term of this patent is extended or adjusted under 35 U.S.C. 154(b) by 120 days.

(21) Appl. No.: 18/723,068

(22) PCT Filed: Sep. 22, 2022

(86) PCT No.: PCT/JP2022/035294
§ 371 (c)(1),
(2) Date: Jun. 21, 2024

(87) PCT Pub. No.: WO2023/119766
PCT Pub. Date: Jun. 29, 2023

(65) Prior Publication Data
US 2025/0058528 A1      Feb. 20, 2025

(30) Foreign Application Priority Data

Dec. 21, 2021      (JP) .................................. 2021-206589

(51) Int. Cl.
*B29C 65/08*          (2006.01)
*B29C 65/56*          (2006.01)
*B29L 31/30*          (2006.01)
(52) U.S. Cl.
CPC .............. *B29C 65/08* (2013.01); *B29C 65/56* (2013.01); *B29L 2031/3014* (2013.01)
(58) Field of Classification Search
CPC ......... B29C 65/08; B29C 65/56; B29C 65/72; B29C 66/73921; B29C 66/21;
(Continued)

(56) References Cited

U.S. PATENT DOCUMENTS

| | | | |
|---|---|---|---|
| 5,054,240 A | 10/1991 | Nakahara et al. | |
| 5,275,455 A | 1/1994 | Harney et al. | |

(Continued)

FOREIGN PATENT DOCUMENTS

| | | |
|---|---|---|
| CN | 114619861 A | 6/2022 |
| CN | 115195429 A | 10/2022 |

(Continued)

OTHER PUBLICATIONS

Oct. 25, 2022 Search Report issued in International Patent Application No. PCT/JP2022/035294.

(Continued)

*Primary Examiner* — James D Sells
(74) *Attorney, Agent, or Firm* — Oliff PLC

(57)          ABSTRACT

A belt molding manufacturing method includes inserting an end cap into a molding body, performing an ultrasonic vibration processing, and performing a non-vibration pressing. The ultrasonic vibration pressing includes pushing an ultrasonic horn in an ultrasonic vibration state against at least one of the molding body and the end cap from a vehicle interior side toward a vehicle exterior side, such that a pressed portion pressed by the ultrasonic horn is melted and deformed to form a hole portion recessed on a pressing surface of the pressed portion and a protruding portion protruding on a surface opposite to the pressing surface. The non-vibration pressing includes stopping an ultrasonic vibration of the ultrasonic horn and further moving the ultrasonic horn in a vibration stopped state from the vehicle interior side toward the vehicle exterior side at the pressed portion.

5 Claims, 8 Drawing Sheets

(58) Field of Classification Search
CPC .............. B29C 66/71; B29C 66/81423; B29C 66/81329; B29C 66/81431
USPC ........................................................ 156/73.1
See application file for complete search history.

(56) References Cited

U.S. PATENT DOCUMENTS

| | | | |
|---|---|---|---|
| 5,799,442 | A | 9/1998 | Takahashi et al. |
| 7,055,291 | B2 | 6/2006 | Nakanishi et al. |
| 7,210,730 | B2 | 5/2007 | Fujita et al. |
| 7,390,050 | B2 | 6/2008 | Nakao et al. |
| 7,407,205 | B2 | 8/2008 | Nakao et al. |
| 7,458,185 | B2 | 12/2008 | Imaizumi et al. |
| 7,785,686 | B2 | 8/2010 | Fukui et al. |
| 8,001,727 | B2 | 8/2011 | Ho et al. |
| 8,572,897 | B2 | 11/2013 | Dishman et al. |
| 8,714,624 | B2 | 5/2014 | Fukui |
| 8,740,276 | B2 | 6/2014 | Takeyoshi |
| 8,758,872 | B2 | 6/2014 | Mutoh et al. |
| 9,038,318 | B2 | 5/2015 | Jendrossek et al. |
| 9,091,114 | B2 | 7/2015 | Franzen |
| 10,035,411 | B2 | 7/2018 | Toyota et al. |
| 10,328,781 | B2 | 6/2019 | Hemauer |
| 10,421,417 | B2 | 9/2019 | Itoh |
| 11,186,153 | B2 | 11/2021 | Hasnaoui et al. |
| 11,607,931 | B2 | 3/2023 | Prekop et al. |
| 11,964,546 | B2 | 4/2024 | Jin et al. |
| 12,227,062 | B2 * | 2/2025 | Funada .................. B60J 10/235 |
| 2005/0189782 | A1 | 9/2005 | Fujita et al. |
| 2005/0198908 | A1 | 9/2005 | Imaizumi et al. |
| 2007/0278827 | A1 | 12/2007 | Nakao et al. |
| 2007/0278830 | A1 | 12/2007 | Nakao et al. |
| 2010/0313487 | A1 | 12/2010 | Ellis et al. |
| 2012/0207979 | A1 | 8/2012 | Mutoh et al. |
| 2013/0008123 | A1 | 1/2013 | Aoi et al. |
| 2013/0097962 | A1 | 4/2013 | Yoshida et al. |
| 2018/0229590 | A1 | 8/2018 | Bito |
| 2024/0100924 | A1 | 3/2024 | Funada et al. |
| 2024/0100925 | A1 | 3/2024 | Robinson |
| 2025/0058528 | A1 | 2/2025 | Funada et al. |

FOREIGN PATENT DOCUMENTS

| | | | |
|---|---|---|---|
| EP | 1652710 | A2 | 5/2006 |
| JP | H05178097 | A | 7/1993 |
| JP | 2002249001 | A | 9/2002 |
| JP | 2004249745 | A | 9/2004 |
| JP | 2005-001551 | A | 1/2005 |
| JP | 2011-207333 | A | 10/2011 |
| JP | 2013-067341 | A | 4/2013 |
| JP | 2013256194 | A | 12/2013 |
| JP | 5909959 | B2 | 4/2016 |
| JP | 2017-056845 | A | 3/2017 |
| JP | 2017-144775 | A | 8/2017 |
| JP | 2018-012352 | A | 1/2018 |
| JP | 2018-131082 | A | 8/2018 |
| JP | 2019-189006 | A | 10/2019 |

OTHER PUBLICATIONS

Oct. 25, 2022 Written Opinion of the International Searching Authority issued in International Patent Application No. PCT/JP2022/035294.

Mar. 22, 2022 International Search Report issued in International Patent Application No. PCT/JP2022/001579.

Mar. 22, 2022 Written Opinion issued in International Patent Application No. PCT/JP2022/001579.

Oct. 11, 2024 Notice of Allowance issued in U.S. Appl. No. 18/275,648.

U.S. Appl. No. 19/018,286, filed Jan. 13, 2025 in the name of Funada et al.

* cited by examiner

REAR ↕ FRONT

DOWN

INSERTION DIRECTION (C)

UP

VEHICLE EXTERIOR SIDE ⟵⟶ VEHICLE INTERIOR SIDE

DOWN (D)

BELT MOLDING MANUFACTURING METHOD

TECHNICAL FIELD

The present invention relates to a belt molding manufacturing method for a vehicle. In particular, the invention relates to a type of a belt molding in which an end cap is attached to one end of a long belt molding body. Examples of a target to which such a belt molding is attached include a door panel such as a front door and a rear door of a vehicle.

BACKGROUND ART

As a belt molding for a vehicle, there is known a type including a long molding body attached along a window opening edge of a door panel and an end cap covering an end of the molding body in a longitudinal direction. Further, there is a method that utilizes resin melting based on ultrasonic vibration when fixing the end cap to the molding body, and Patent Literature 1 is an example thereof.

A door waist molding of Patent Literature 1 includes a molding body 10 having a design surface 11a, and a fixture 20 (corresponding to an end cap) for fixing the molding body 10 to a door (see abstract). According to paragraph 0027 of this literature and FIGS. 5 and 8, a lower edge portion 23c of an outer side wall 23 of the fixture 20 contacts an inner surface 11b of an outer side wall 11, which is a back side of the design surface 11a of the molding body 10, to form an interface 1a between the resin portions. Then, a welded portion 1b made of melted portions 11d and 23d is formed on the interface 1a by a welding method such as thermal welding or ultrasonic welding. Paragraph 0028 and FIG. 8 of this literature disclose a specific procedure leading to formation of the welded portion. That is, as shown in (a) of FIG. 8, after a part of the fixture 20 is brought into contact with the inner surface 11b of the molding body 10, as shown in (b) of FIG. 8, a welding member 40 constituting a heat source or an ultrasonic vibration source is fitted from the outer side wall 23 side of the fixture 20 to reach a vicinity of the interface 1a. Thereafter, by removing the welding member 40, the welded portion 1b (melted portions 11d and 23d) as shown in (c) of FIG. 8 is formed.

CITATION LIST

Patent Literature

Patent Literature 1: JP2005-001551A

SUMMARY OF INVENTION

Technical Problem

However, even in a technique disclosed in Patent Literature 1, the following problems are found. That is, when the welding member 40 is fitted into the outer side wall 23 of the fixture 20 and then the welding member 40 is removed from the outer side wall 23, a hole is formed in the outer side wall 23 as a trace of the welding member being removed, but in addition to this, a raised portion (so-called burr) is incidentally formed at a periphery of the above-described hole on a door outer panel 4 side (that is, a side opposite to the interface 1a) of the outer side wall 23 (see (c) of FIG. 8 of this literature). If the raised portion is large or a distance between the door outer panel 4 and the outer side wall 23 is short, the raised portion may hit the door outer panel 4 in a state in which the molding is attached to the vehicle, resulting in an obstacle. Such a situation is not preferable.

In the technique of Patent Literature 1, the inner surface of the molding body 10 and the outer side wall 23 of the fixture 20 are thermally welded to each other by a high heat quantity caused by the heat source or the ultrasonic vibration source to form the welded portion 1b. Therefore, both the molding body and the fixture (end cap) need to be made of resin materials having the same melting point or close melting points, and there is also a disadvantage that a degree of freedom of selection of material is small.

A main object of the present invention is to provide a belt molding manufacturing method that can prevent or control formation of an unnecessary raised portion at a resin melted portion or in a vicinity thereof even when a resin melting method by ultrasonic vibration is used to fix an end cap to a molding body.

Solution to Problem

The invention of claim 1 is characterized by a belt molding manufacturing method which is a method for manufacturing a belt molding configured to be attached along an upper edge of a door panel of a door for a vehicle, the belt molding including a long molding body and an end cap attached to one end portion of the molding body, at least one of the molding body and the end cap being made of a thermoplastic resin, the method including:

a step of preparing the molding body, the molding body including a vehicle exterior side wall portion and a vehicle interior side wall portion facing each other, and a top wall portion integrally connecting the two side wall portions;

a step of preparing the end cap, the end cap including a lid portion configured to close an opening end of the molding body, and an insertion portion extending from the lid portion and configured to be inserted between the vehicle exterior side wall portion of the molding body and the vehicle interior side wall portion of the molding body;

an inserting step of inserting the insertion portion of the end cap into the molding body such that the insertion portion of the end cap is disposed to face a part of the molding body (hereinafter referred to as "facing portion") that is to face the insertion portion;

an ultrasonic vibration pressing step of pressing an ultrasonic horn in an ultrasonic vibration state against at least one of the facing portion of the molding body and the insertion portion of the end cap, and pushing the ultrasonic horn from a vehicle interior side toward a vehicle exterior side, such that a pressed portion pressed by the ultrasonic horn is melted and deformed to form a hole portion recessed on a pressing surface of the pressed portion and a protruding portion protruding on a surface opposite to the pressing surface;

a non-vibration pressing step of stopping an ultrasonic vibration of the ultrasonic horn and further moving the ultrasonic horn in a vibration stopped state from the vehicle interior side toward the vehicle exterior side at the pressed portion; and a removing step of removing the ultrasonic horn from the pressed portion.

According to the invention of claim 1, after the facing portion of the molding body and the insertion portion of the end cap are disposed to face each other, by pressing and pushing the ultrasonic horn in the ultrasonic vibration state against at least one of these two portions, the pressed portion pressed by the ultrasonic horn is melted and deformed, whereby the hole portion and the protruding portion can be formed at the same time at the pressed portion (the protruding portion is involved in fixing the end cap to the molding body). At this time, as the ultrasonic horn in the ultrasonic vibration state is pushed in, a raised portion may be generated around the hole portion simultaneously formed with the protruding portion due to the molten resin overflowing from the hole portion in search of a place to escape. If this raised portion were to remain and solidify, it would become a burr. However, in the present invention, in the non-vibration pressing step following the ultrasonic vibration pressing step, while solidification (that is, decrease in flowability) of the molten resin is prompted by stopping the vibration of the ultrasonic horn, the ultrasonic horn in the vibration stopped state is moved from the vehicle interior side toward the vehicle exterior side, whereby the molten resin that has risen around the hole portion can be drawn into the hole portion and gradually solidified. Accordingly, according to the present invention, it is possible to prevent or control formation of the unnecessary raised portion at the hole portion simultaneously formed with the protruding portion or in the vicinity thereof, even when the protruding portion is formed by using the resin melting method by the ultrasonic vibration in order to fix the end cap to the molding body.

The invention of claim 2 is characterized by the belt molding manufacturing method according to claim 1, in which:

the insertion portion of the end cap includes a catch surface provided to intersect with an insertion direction of the end cap, and the facing portion of the molding body is positioned on the vehicle interior side relative to the insertion portion of the end cap; and in the ultrasonic vibration pressing step, the protruding portion protruding from the vehicle interior side toward the vehicle exterior side is formed in the molding body by melting and deforming a portion of the facing portion of the molding body on a lid portion side of the end cap relative to the catch surface.

According to the invention of claim 2, in addition to the effect of the first aspect, the following effect is further exhibited. That is, by forming the protruding portion by melting and deforming a portion of the facing portion of the molding body on the lid portion side of the end cap relative to the catch surface, movement of the end cap in the direction opposite to the insertion direction is prevented based on the engagement (mechanical engagement) between the protruding portion and the catch surface of the insertion portion of the end cap, and the end cap can be prevented from coming off from the molding body. In this method, since the molding body and the end cap are not welded to each other, it is not necessary to form the molding body and the end cap from materials having close melting points, and there is little limitation on selection of material.

The invention of claim 3 is characterized by the belt molding manufacturing method according to claim 1 or 2, in which:

a push-in movement amount (X) of the ultrasonic horn in the ultrasonic vibration pressing step is larger than a movement amount (Y) of the ultrasonic horn in the non-vibration pressing step.

According to the invention of claim 3, in addition to the effect of the first and second aspects, the following effect is further exhibited. That is, by setting the push-in movement amount (X) of the ultrasonic horn in the ultrasonic vibration state to be larger than the movement amount (Y) of the ultrasonic horn in the vibration stopped state (Y<X), it is possible to sufficiently secure the protruding amount of the protruding portion.

The invention of claim 4 is characterized by the belt molding manufacturing method according to any one of claims 1 to 3, in which:

the ultrasonic horn includes a tip projecting portion formed at a tip of the ultrasonic horn, an annular recessed portion formed on an outer periphery of the tip projecting portion, and an annular protrusion formed on an outer peripheral edge of the annular recessed portion.

According to the invention of claim 4, in addition to the effect of any one of the first to third aspects, the following effect is further exhibited. That is, according to the above ultrasonic horn, in the ultrasonic vibration pressing step and the non-vibration pressing step, the ultrasonic horn can be stably pushed toward one of the facing portion of the molding body and the insertion portion of the end cap. In addition, as compared with a case where the annular recessed portion is not formed in the ultrasonic horn, a resistance received by the ultrasonic horn from the molten resin can be reduced.

The invention of claim 5 is characterized by the belt molding manufacturing method according to the fourth aspect, in which:

in the ultrasonic vibration pressing step, the tip projecting portion of the ultrasonic horn ultrasonically vibrates.

According to the invention of claim 5, in addition to the effect of the fourth aspect, the following effect is further exhibited. That is, by vibrating only the tip projecting portion of the ultrasonic horn, rather than vibrating the entire ultrasonic horn including the annular recessed portion, the amount of resin to be melted can be reduced and a part of the molten resin can be received by the annular recessed portion, and therefore, the amount of excessive molten resin overflowing and raising around the hole portion can be reduced.

Advantageous Effects of Invention

As described above in detail, according to the present invention, it is possible to prevent or control formation of the unnecessary raised portion at the hole portion simultaneously formed with the protruding portion or in the vicinity thereof, even when the protruding portion is formed by using the resin melting method by the ultrasonic vibration in order to fix the end cap to the molding body.

BRIEF DESCRIPTION OF DRAWINGS

FIG. 4 is an exploded view (back side view) of the belt molding shown in FIG. 3.

DESCRIPTION OF EMBODIMENTS

Hereinafter, an embodiment according to the present invention will be described with reference to the drawings.

Figure 1:
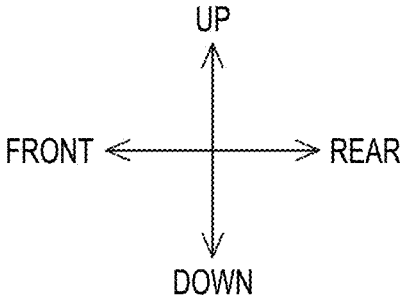
FIG. 1 is a schematic view of a door (front door) for a vehicle.
Figure 1:
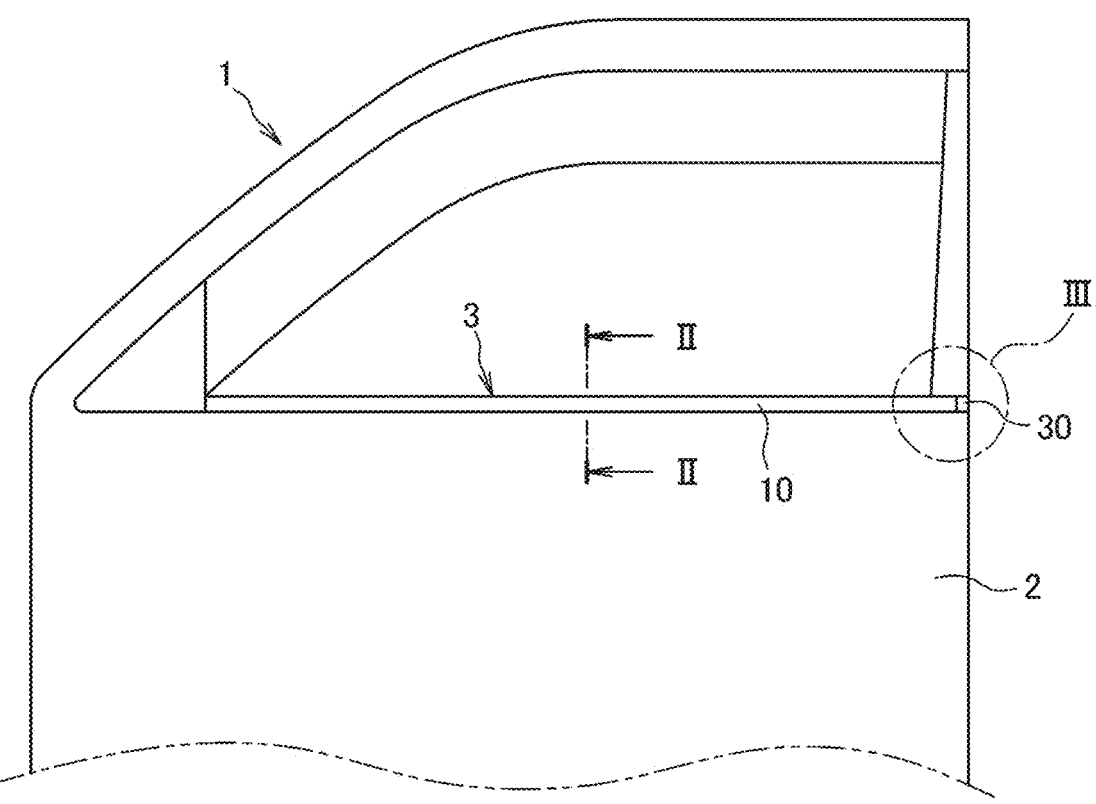

FIG. 1 shows a typical use example of a belt molding according to the present invention. As shown in FIG. 1, a belt molding 3 is attached to a door panel 2 on an outer side constituting a lower half portion of a door 1 for a vehicle along an upper edge (a belt line) of the door panel 2. The belt molding 3 includes a body portion (hereinafter, referred to as a "molding body") 10 of a long belt molding, and an end cap 30 attached to a rear end portion (a right end portion as viewed in FIG. 1) of the molding body 10.

Figure 2:
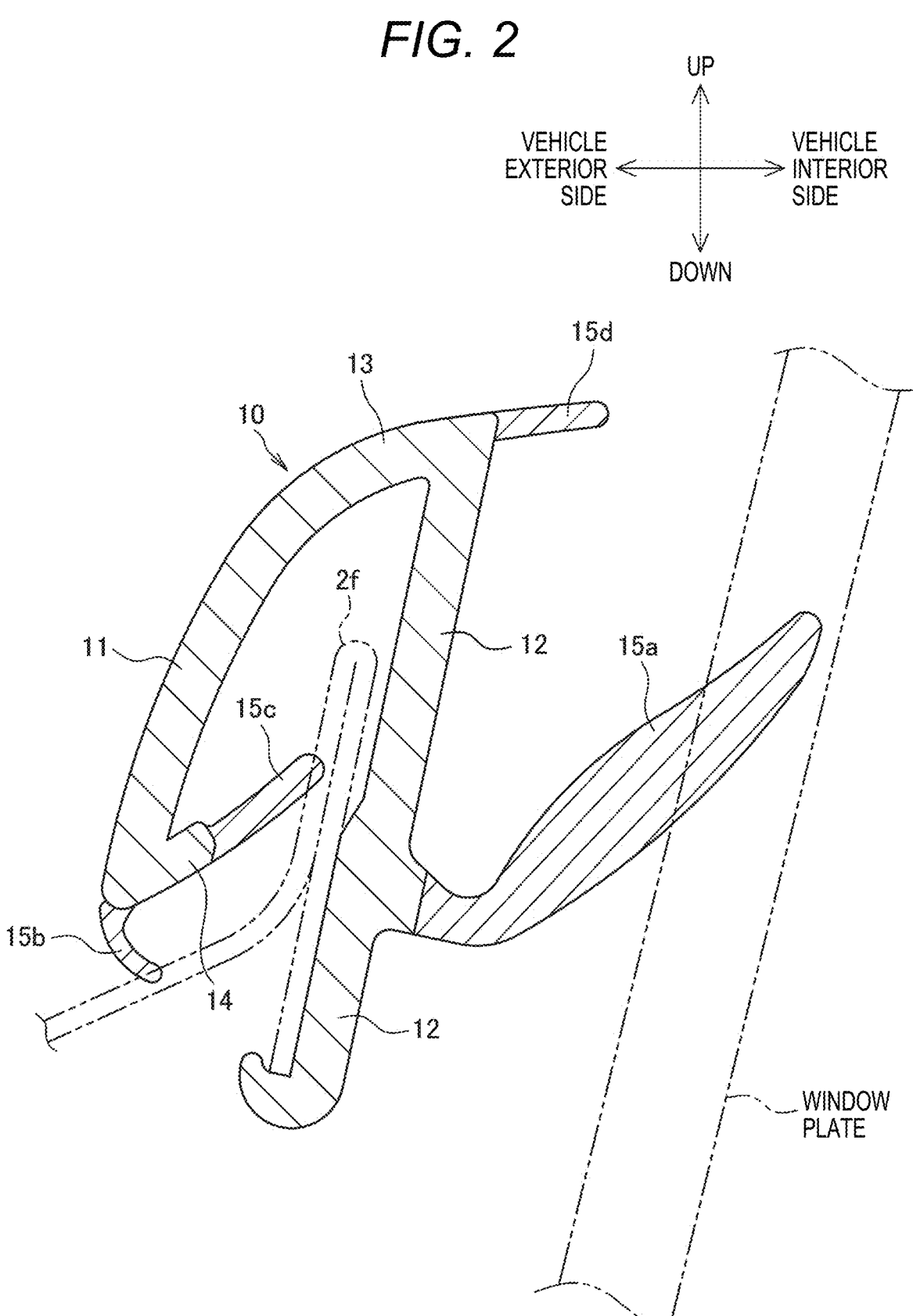
FIG. 2 is a cross-sectional view of a belt molding taken along a line II-II in FIG. 1.

As shown in FIG. 2, the molding body 10 includes a vehicle exterior side wall portion 11 and a vehicle interior side wall portion 12, which face each other, and a top wall portion 13 integrally connecting the two side wall portions 11 and 12. With the three wall portions (11 to 13), the molding body 10 has a substantially U-shaped cross section opening downward. A folded protrusion 14 formed so as to be folded back toward a vehicle interior side is provided at a lower end of the vehicle exterior side wall portion 11. A vehicle interior side lip 15*a* is provided on a vehicle interior side wall surface of the vehicle interior side wall portion 12, a vehicle exterior side lip 15*b* is provided in a vicinity of the lower end of the vehicle exterior side wall portion 11, a holding lip 15*c* is provided at a tip of the folded protrusion 14 at the lower end of the vehicle exterior side wall portion, and a decorative lip 15*d* is provided in a vicinity of a joint portion between the top wall portion 13 and the vehicle interior side wall portion 12. However, these lips 15*a* to 15*d* are generally known. When a flange 2*f* (indicated by an imaginary line) of the door panel 2 is inserted into a lower opening of the belt molding 3, the flange 2*f* is sandwiched between the holding lip 15*c* and the vehicle interior side wall portion 12, and the belt molding 3 is attached to the door panel 2.

The molding body 10 is preferably formed by extrusion molding an olefinic thermoplastic resin material. However, a relatively hard olefinic thermoplastic resin (for example, polypropylene) is used for the three wall portions (11 to 13) and the protrusion (14) of the molding body 10. On the other hand, a relatively soft olefinic thermoplastic elastomer is used for the four lips (15*a* to 15*d*) other than the three wall portions and the protrusion. The molding body 10 may be made of a material other than the olefinic thermoplastic resin (for example, a styrene thermoplastic resin, vinyl chloride, rubber, or the like), as long as the material is meltable and elastically deformable.

The end cap 30 is preferably made of polybutylene terephthalate (PBT) which is a type of a thermoplastic resin. Examples of the thermoplastic resin that can be used for the end cap 30 include an acrylonitrile butadiene styrene (ABS) resin, polypropylene (PP), polyacetal (POM), polyamide (PA), polyphenylene sulfide (PPS), and polyether ether ketone (PEEK), in addition to PBT.

Figure 3:
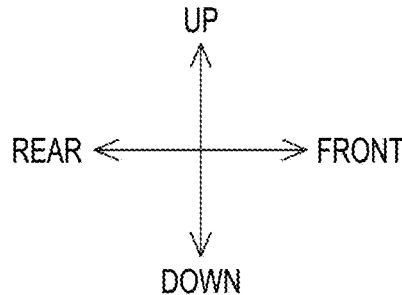
FIG. 3 is a back side view of the belt molding (circled portion III in FIG. 1) according to one embodiment as viewed from a back side.
Figure 3:
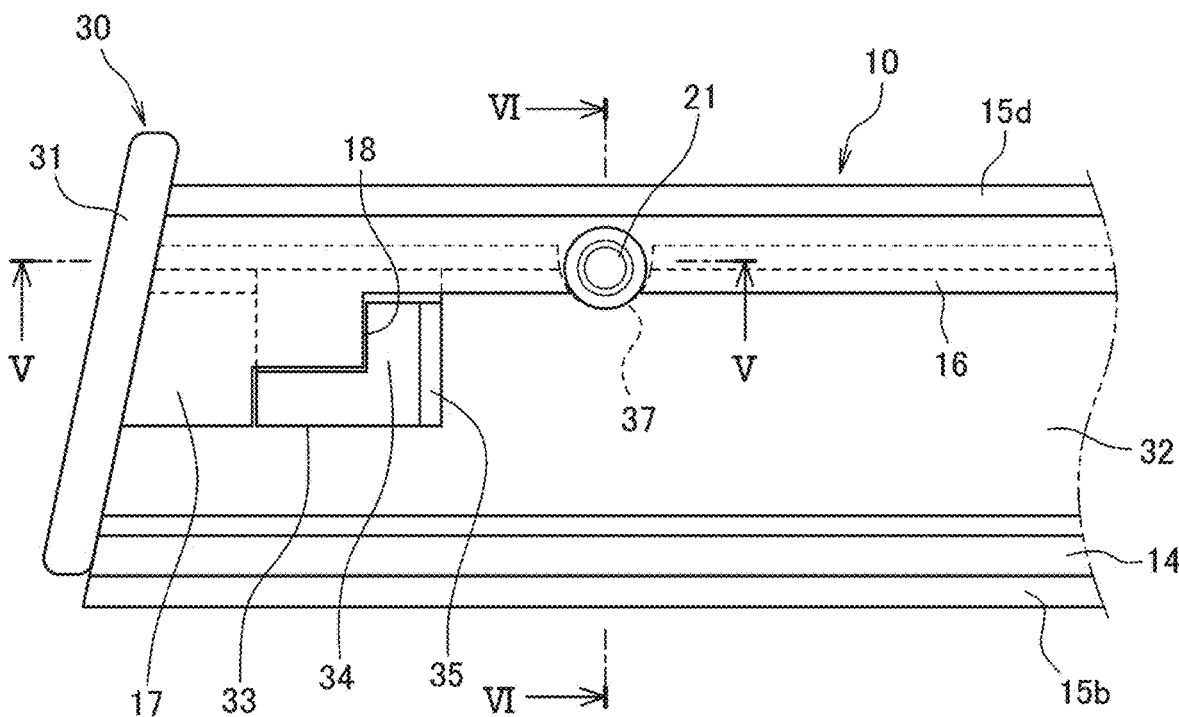
Figure 4:
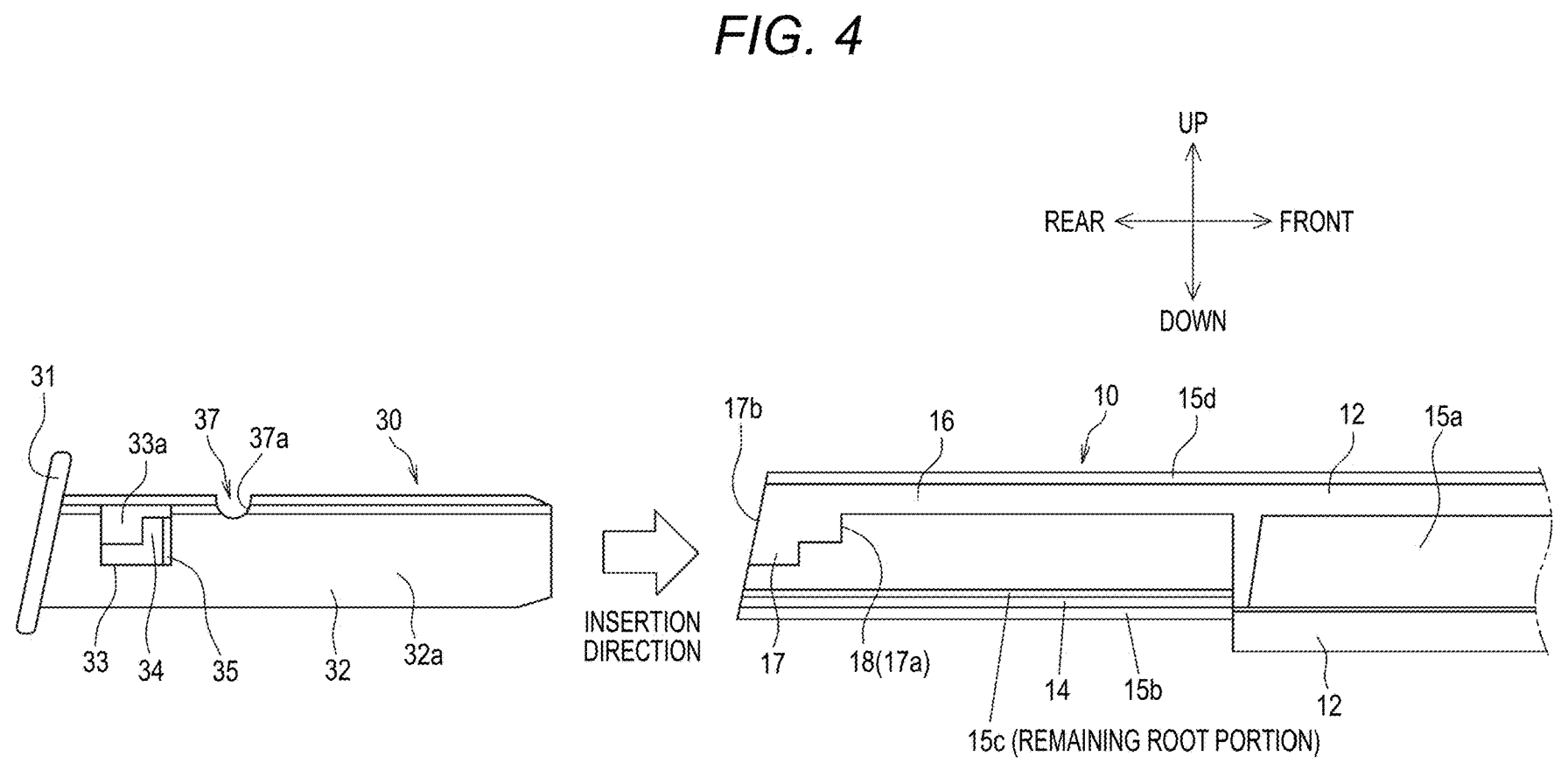

FIGS. 3 to 7 show main features of the belt molding according to the present embodiment. FIG. 3 shows an assembled state of the belt molding in a vicinity of end cap 30, and FIG. 4 shows a state in which the molding body 10 and the end cap 30 are disassembled. As shown in FIG. 4, in a vicinity of the rear end portion of the molding body 10, mainly a lower side portion of the vehicle interior side wall portion 12 is removed, and an upper side portion of the vehicle interior side wall portion 12 remains (hereinafter, this remaining portion is referred to as a "side wall remaining portion 16"). Incidentally, the side wall remaining portion 16 does not include the vehicle interior side lip 15*a*, and along with the formation of the side wall remaining portion 16, the holding lip 15*c* at a portion of the holding lip 15*c* of the vehicle exterior side wall portion 11 that faces the side wall remaining portion 16 is also substantially cut off while leaving only a root portion. An internal space for inserting and disposing an insertion portion 32 of the end cap 30 is defined by the three wall portions (the vehicle exterior side wall portion 11, the top wall portion 13, and the side wall remaining portion 16) positioned in the vicinity of the rear end portion of the molding body 10.

As shown in FIGS. 3 and 4, an extension portion 17 is formed at an end of the molding body 10 by a part of the side wall remaining portion 16. The extension portion 17 is a side wall portion that extends downward from an upper edge of the vehicle interior side wall portion 12 and forms a portion of the side wall remaining portion 16. When the end cap 30 is attached to the molding body 10, the extension portion 17 is elastically deformable to some extent toward a vehicle interior side direction. The extension portion 17 includes a front side edge 17*a* and a rear side edge 17*b*, and a locked portion 18 extending in a direction intersecting an insertion direction of the end cap is formed on the front side edge 17*a*. The rear side edge 17*b* of the extension portion 17 forms a rear end (an opening end) of the molding body 10.

As shown in FIGS. 3 and 4, the end cap 30 includes a lid portion 31 and an insertion portion 32 extending substantially horizontally from a front surface of the lid portion 31 along a longitudinal direction (that is, the insertion direction) of the end cap. The lid portion 31 is a portion for closing the rear end (the opening end) of the molding body 10, and constitutes a rearmost end portion of the end cap 30. The insertion portion 32 is a portion that is to be inserted and disposed between the vehicle exterior side wall portion 11 and the side wall remaining portion 16 of the molding body 10. The insertion portion 32 includes a vehicle interior side surface 32*a* extending along the insertion direction of the end cap on the vehicle interior side.

The insertion portion 32 of the end cap is provided with a thick plate tab-shaped support portion (hereinafter, referred to as a "support tab") 33 formed so as to extend downward from an upper edge of the insertion portion 32. The support tab 33 is a part of the insertion portion 32 of the end cap. The support tab 33 has a substantially rectangular shape in a side view, and a locking portion 34 protruding from a vehicle interior side surface 33*a* of the support tab 33 toward the vehicle interior side direction is provided at a front part of the support tab 33. When the end cap 30 is inserted into the molding body 10, the locking portion 34 functions as a unit for temporarily positioning (or temporarily fixing) the end cap 30 with respect to the molding body 10 based on mutual locking with the locked portion 18 of the extension portion 17. As shown in FIG. 4, an inclined surface 35 is formed at a front side position of the locking portion 34 of the support tab 33. When the end cap 30 is inserted into the molding body 10, the inclined surface 35 functions as a pressing and guiding action surface for pressing the extension portion 17 of the molding body toward the vehicle interior side direction to guide temporary elastic deformation.

The end cap 30 includes a catch portion 37 formed at an upper side portion of the insertion portion 32 at a position forward of the support tab 33. The catch portion 37 is a recessed portion cut out in a substantially semicircular shape in a side view shown in FIG. 4, and the semicircular shape corresponds to a tip outer shape (a circular shape) of an ultrasonic horn 40 to be described later. A radius of the semicircular shape of the catch portion 37 is preferably set to be slightly larger than a radius of the circular shape of the ultrasonic horn. In this way, it is possible to prevent the resin by which the side wall remaining portion 16 to be described later is melted from overflowing around the semicircular shape of the catch portion 37. The catch portion 37 includes a curved catch surface 37a (see FIGS. 4 and 5) on an inner side of the recessed shape, the catch surface 37a extending in vehicle interior and exterior directions (a width direction of the end cap). The catch surface 37a is in a positional relationship of intersecting with the vehicle interior side surface 32a of the insertion portion 32 of the end cap, and acts to prevent movement of the end cap (that is, movement in a direction opposite to the insertion direction of the end cap) based on engagement with a protruding portion 21 to be described later.

Figure 5:
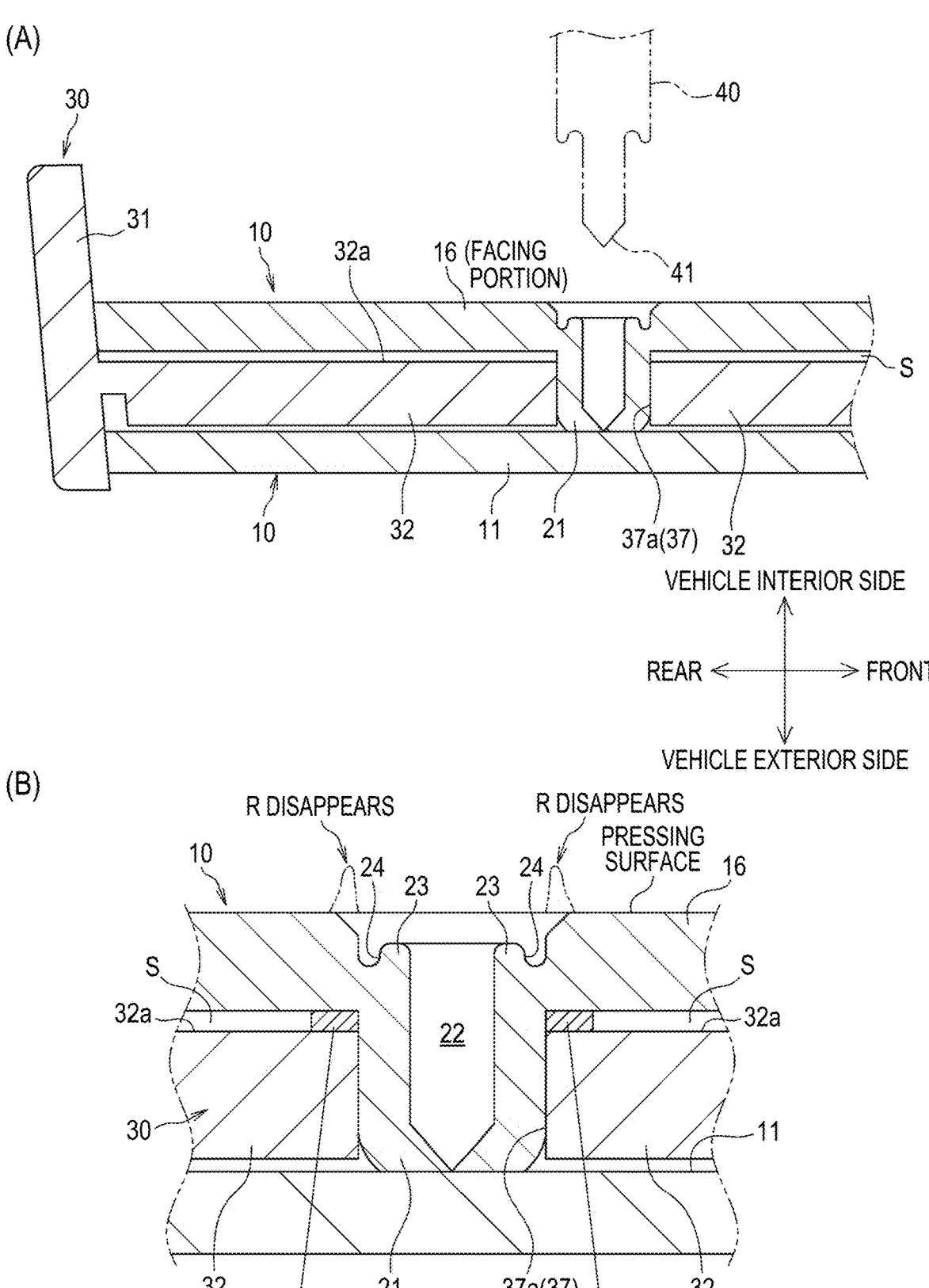
FIG. 5(A) of FIG. 5 shows a cross section taken along a line V-V in FIG. 3, and (B) of FIG. 5 is a partially enlarged sectional view showing a part of (A) in an enlarged manner.

In FIGS. 4 and 5, the catch portion 37 is shown as the recessed portion that penetrates the insertion portion 32 in the vehicle interior and exterior directions (the width direction of the end cap), but the catch portion 37 serving as the recessed portion does not need to penetrate the insertion portion 32, and may be a non-penetrating recessed portion in which the vehicle interior side surface 32a of the insertion portion 32 is merely recessed toward a vehicle exterior side. In short, a form (penetrating/non-penetrating) of the catch portion 37 is not limited as long as the catch surface 37a as described above can be provided.

Next, a method for attaching and fixing the end cap 30 to the molding body 10 (that is, a method for assembling the belt molding) will be described. This method generally includes an inserting step of inserting and disposing the end cap 30 into the molding body 10, after preparing the molding body 10 and the end cap 30 in advance as described above, and a series of steps (collectively referred to as "protruding portion forming process") for forming the protruding portion 21 to be described later on the molding body 10 in order to fix the end cap 30 to the molding body 10.

In the inserting step, the insertion portion 32 of the end cap 30 is inserted into the molding body from the opening end of the molding body 10. Then, first, the inclined surface 35 positioned on the front side of the locking portion 34 of the end cap contacts the rear side edge 17b of the extension portion 17 of the molding body. As the end cap 30 is further pushed in after the contact, the rear side edge 17b of the extension portion slides while contacting the inclined surface 35, and the extension portion 17 is progressively elastically deformed toward the vehicle interior side direction due to a pressing and guiding action of the inclined surface 35. Thereafter, when the end cap 30 is further pushed in and the locking portion 34 of the end cap passes through a position of the extension portion 17, the sliding contact between the extension portion 17 and the locking portion 34 is released, and the extension portion 17 that is temporarily elastically deformed returns to an original position or shape before the deformation. The lid portion 31 of the end cap contacts the opening end of the molding body 10 substantially in synchronization with the return of the extension portion 17 from an elastically deformed state. Due to this contact, the end cap 30 cannot move further forward, and the insertion of the end cap 30 into the molding body 10 is completed (see FIGS. 3 and 4).

In an insertion completion state, as shown in FIG. 3, the locking portion 34 of the end cap 30 is disposed in front of the locked portion 18 of the extension portion 17 of the molding body. Therefore, even if an external force in a pull-out direction (that is, the direction opposite to the insertion direction of the end cap) acts on the end cap 30, the locking portion 34 is caught by the locked portion 18, and the end cap 30 does not come off from the molding body 10. In this manner, the end cap 30 is temporarily positioned with respect to the molding body 10 based on the mutual locking between the locking portion 34 and the locked portion 18. This is a prerequisite or preparation for smooth execution of the subsequent protruding portion forming process.

Figure 6:
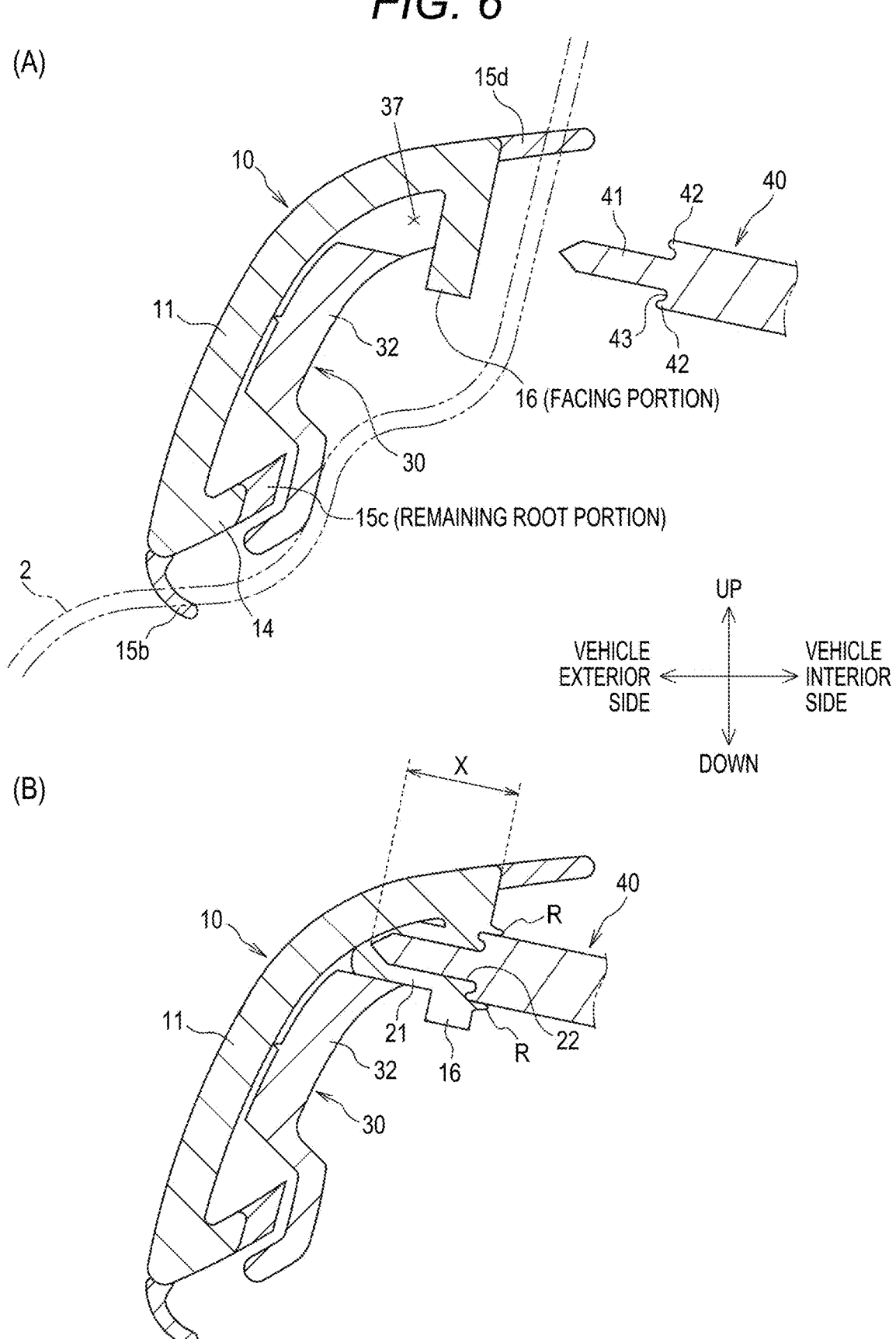
FIG. 6 shows cross sections taken along a line VI-VI in FIG. 3, and (A) and (B) are schematic sectional views showing a series of steps for forming a protruding portion.

In the insertion completion state, as shown in (A) of FIG. 6 and (A) of FIG. 5, the upper side portion of the insertion portion 32 of the end cap 30 (in particular, in a vicinity of the catch portion 37) and the side wall remaining portion 16 of the molding body 10 are disposed to face each other. That is, in the present embodiment, the side wall remaining portion 16 serves as a "facing portion that is positioned on the vehicle interior side relative to the insertion portion (32) of the end cap and that faces the insertion portion (32)". Incidentally, as can be seen from (A) of FIG. 5, as a result of the insertion portion 32 and the side wall remaining portion 16 serving as the facing portion facing each other substantially in parallel, a gap S is inevitably formed between the both.

In the protruding portion forming process subsequent to the inserting step, by deforming (melting and deforming) a portion of the side wall remaining portion 16 serving as the facing portion, which is positioned on a lid portion 31 side relative to the catch surface 37a of the end cap, the protruding portion 21 protruding on the vehicle exterior side relative to the vehicle interior side surface 32a of the insertion portion 32 of the end cap is formed in the molding body 10.

In the protruding portion forming process, the ultrasonic horn 40 as partially and schematically shown in (A) of FIG. 6 is used as a melting deformation unit. The ultrasonic horn 40 used in the present embodiment includes a tip projecting portion 41 having a circular cross section and an annular protrusion 42 surrounding the tip projecting portion 41 at a tip of the ultrasonic horn 40. An annular recessed portion 43 is formed along an outer peripheral edge of the tip projecting portion 41 between the tip projecting portion 41 and the annular protrusion 42. The annular recessed portion 43 receives a part of the resin melted by the tip projecting portion 41. When forming the protruding portion, the ultrasonic horn 40 is disposed on the vehicle interior side of the molding body 10, and a rear side surface of the lid portion 31 of the end cap 30 is brought into contact with a jig (not shown) to position the end cap 30 and the molding body 10.

Figure 7:
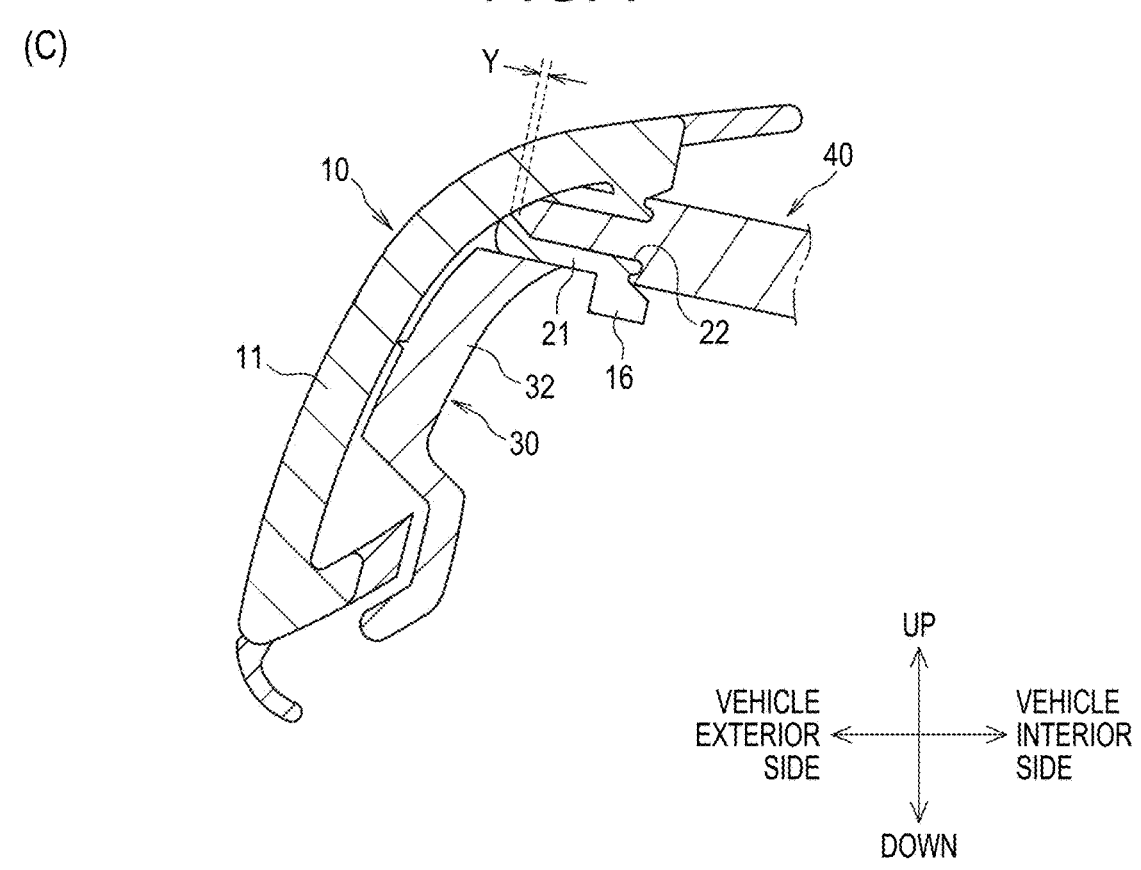
FIG. 7 shows cross sections taken along the line VI-VI in FIG. 3, and (C) and (D) are schematic sectional views showing the series of steps for forming the protruding portion.
Figure 7:
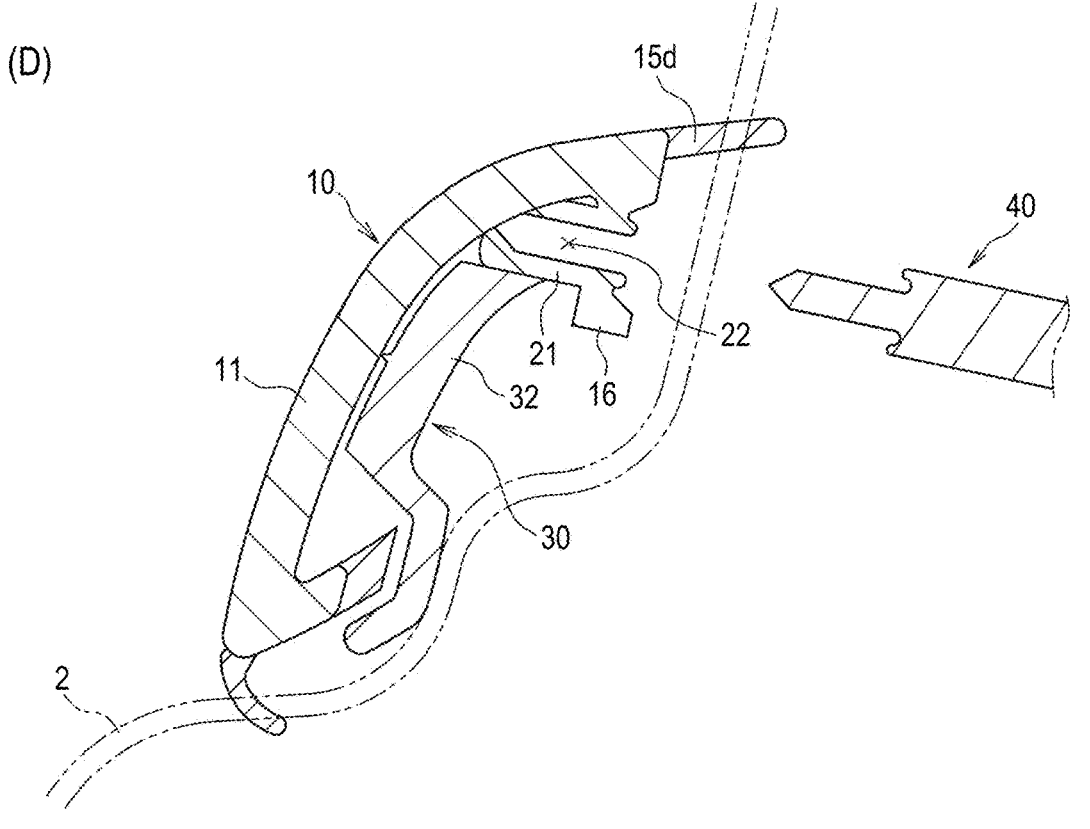

(A) and (B) of FIG. 6 and (C) and (D) of FIG. 7 show a specific procedure of the protruding portion forming process of forming the protruding portion 21 on the molding body 10. The protruding portion forming process includes a series of processes including an ultrasonic vibration pressing step, a non-vibration pressing step, and a removing step.

In the ultrasonic vibration pressing step shown in (A) and (B) of FIG. 6, first, the ultrasonic horn 40 is disposed to face the side wall remaining portion 16 and the insertion portion 32 so that the tip projecting portion 41 of the ultrasonic horn 40 faces the catch portion 37 of the end cap 30 with the side wall remaining portion 16 of the molding body interposed therebetween (see (A) of FIG. 6). Then, after the tip projecting portion 41 of the ultrasonic horn 40 is pressed against the side wall remaining portion 16 at a substantially right angle, the tip projecting portion 41 of the ultrasonic horn 40 is ultrasonically vibrated, and is slowly pushed toward the catch portion 37 (that is, is advanced while being pressed).

As the ultrasonic horn 40 in this ultrasonic vibration state is pushed, a part of the side wall remaining portion 16 is heated and melted in a pinpoint manner, and the molten resin enters the catch portion 37 while being pressed by the tip projecting portion 41 of the ultrasonic horn, whereby at least the protruding portion 21 and a hole portion 22 at a center are simultaneously formed in the side wall remaining portion 16 (see (B) of FIG. 6). At this time, as shown in (B) of FIG. 6, the molten resin occupying the inside of the hole portion 22 overflows from a periphery edge of the hole portion 22 in search of a place to escape, a part of the molten resin enters the annular recessed portion 43 of the ultrasonic horn and the excessive molten resin that has not been completely accommodated in the annular recessed portion 43 climbs over the annular protrusion 42 and bulges outward from around the hole portion 22. In this manner, an annular raised portion R formed of the leaked molten resin is temporarily formed so as to be raised from a pressing surface of the side wall remaining portion 16, which is a pressed portion by the ultrasonic horn 40, along an outer peripheral surface of the ultrasonic horn 40. An amount (push-in movement amount X) by which the ultrasonic horn 40 in the ultrasonic vibration state is pushed from the vehicle interior side toward the vehicle exterior side after the tip projecting portion 41 of the ultrasonic horn 40 is brought into contact with the pressing surface of the side wall remaining portion 16 is, for example, 4.0 mm.

Subsequently to the ultrasonic vibration pressing step, in the non-vibration pressing step shown in (C) of FIG. 7, the ultrasonic horn 40 in a vibration stopped state is further pushed toward the vehicle exterior side from the vehicle interior side when the ultrasonic vibration of the tip projecting portion 41 of the ultrasonic horn 40 is stopped. When heat supply to the molten resin is stopped by stopping the vibration of the ultrasonic horn 40, solidification of the molten resin or decrease in flowability of the molten resin is promoted by natural cooling. In this situation, by further moving the ultrasonic horn 40 in the vibration stopped state to the vehicle exterior side, the molten resin constituting the raised portion R temporarily generated around the hole portion 22 is drawn into the hole portion 22, and then gradually loses flowability and solidifies. As a result, the temporarily generated raised portion R is substantially lost at an end stage of the non-vibration pressing step, or is reduced to such an extent that it cannot be visually confirmed, and so-called burr is prevented or controlled from being generated.

In the present embodiment, an amount (movement amount Y) of further moving the ultrasonic horn 40 in the vibration stopped state from the vehicle interior side toward the vehicle exterior side after the vibration of the ultrasonic horn 40 is stopped is, for example, 0.04 mm. By setting the push-in movement amount X of the ultrasonic horn 40 in the ultrasonic vibration state to be larger than the movement amount Y of the ultrasonic horn 40 in the vibration stopped state (Y<X), it is possible to sufficiently secure a protruding amount of the protruding portion 21 toward the vehicle exterior side.

The amount of movement of the ultrasonic horn 40 in the vibration stopped state in the non-vibration pressing step may be controlled (or managed) by the movement amount Y or may be controlled (or managed) with time. For example, in the case of controlling the amount with time, it is preferable that a predetermined force is applied to the ultrasonic horn, and the sum of an amount of time for the ultrasonic vibration pressing step and an amount of time for the non-vibration pressing step is set to 2 seconds. According to such movement control (or movement amount management), reproducibility of the protruding portion 21 and the hole portion 22 (and the vicinity thereof) simultaneously formed based on the melt deformation is enhanced, and the quality of the belt molding can be stabilized.

After the non-vibration pressing step, as shown in (D) of FIG. 7, the ultrasonic horn 40 is removed from the side wall remaining portion 16 (removing step). In other words, the ultrasonic horn 40 in the vibration stopped state is moved backward in a direction (backward direction) opposite to the pushing-in or pressing direction (forward direction) in the ultrasonic vibration pressing step and the non-vibration pressing step, and the ultrasonic horn 40 is separated from the side wall remaining portion 16. Then, the protruding portion 21 which has been solidified is completely solidified in the catch portion 37 by natural cooling, whereby the solid protruding portion 21 is completed.

As shown in (B) of FIG. 5 and (D) of FIG. 7, on the back side (base end side) of the protruding portion 21 after removal of the ultrasonic horn 40, complementary shapes (that is, the hole portion 22 on a center, an annular projecting portion 23, and an annular groove 24) are respectively formed as pull-out traces reflecting the tip projecting portion 41, the annular recessed portion 43, and the annular protrusion 42 of the ultrasonic horn 40. Meanwhile, the hole portion 22 is regarded, with respect to the protruding portion 21 protruding from one surface of the side wall remaining portion 16 as the pressed portion pressed by the ultrasonic horn, as a portion recessed on the pressing surface of the side wall remaining portion 16 (the pressed portion).

As suggested in (B) of FIG. 5, the raised portion R temporarily generated at the pressing surface of the side wall remaining portion 16 substantially disappears when the protruding portion forming process is completed, and there is no so-called burr on the pressing surface. As described above, according to the present embodiment, since a burr is not generated around the hole portion 22, when the belt molding is attached to the door panel, it is also possible to dispose other parts on the vehicle interior side of the belt molding without the burrs getting in the way.

As shown in (A) of FIG. 5 and (D) of FIG. 7, the completed protruding portion 21 is disposed in the catch portion 37 of the end cap, and is disposed adjacent to the catch surface 37*a* in the longitudinal direction of the belt molding and contacts the catch surface 37*a*. The molding body 10 and the end cap 30 are fixed to each other by mutual contact between the protruding portion 21 on the molding body side and the catch surface 37*a* on the end cap side, and rattling between the molding body 10 and the end cap 30 is prevented or controlled.

As a part of the side wall remaining portion 16 is melted by the ultrasonic horn 40 in the process of forming the protruding portion, as shown in an enlarged view shown in (B) of FIG. 5, a small part of the melted thermoplastic resin (19) leaks out to the periphery of the protruding portion 21, enters the gap S between the insertion portion 32 and the side wall remaining portion 16, and fills the gap S. However, the gap S is very narrow, and thus the molten resin 19 does not flow out of the gap S immediately, and can be appropriately retained in the gap S due to a surface tension or the like of the molten resin. The resin layer 19, which fills the gap S, is solidified in an integrated state with the protruding portion 21 over time, and the resin layer 19 solidified in the gap S serves as an aid for preventing or controlling rattling between the molding body 10 and the end cap 30.

A length and the diameter of the tip projecting portion 41 of the ultrasonic horn 40 can be appropriately selected.

Incidentally, as suggested in FIGS. 5 to 7, in the ultrasonic vibration pressing step and the non-vibration pressing step according to the present embodiment, the length of the tip projecting portion 41 is set (selected) so that the tip projecting portion 41 of the ultrasonic horn 40 can contact the back surface of the vehicle exterior side wall portion 11, but it is not necessary to make the tip projecting portion 41 so long that the tip projecting portion 41 contacts the back surface of the vehicle exterior side wall portion 11, and the length may be made a little shorter.

Effects of Embodiment

According to the present embodiment, the protruding portion 21 and the hole portion 22 can be formed at the same time in the side wall remaining portion 16 of the molding body (the pressed portion by the ultrasonic horn 40) through the protruding portion forming process described above. In particular, in the non-vibration pressing step following the ultrasonic vibration pressing step, when the vibration of the ultrasonic horn 40 is stopped and the solidification of the molten resin (that is, the decrease in flowability) is prompted, the ultrasonic horn 40 in the vibration stopped state is further moved from the vehicle interior side to the vehicle exterior side, whereby the molten resin that has risen around the hole portion 22 can be gradually solidified while being drawn into the hole portion 22. Accordingly, it is possible to prevent or control formation of the unnecessary raised portion R at the hole portion 22 formed simultaneously with the protruding portion 21 or in a vicinity thereof.

According to the present embodiment, the protruding portion 21 formed by melting and deforming a part of the side wall remaining portion 16 serving as the facing portion is caused to protrude on the vehicle exterior side relative to the vehicle interior side surface 32a of the insertion portion 32 of the end cap, and thus the movement of the end cap 30 in the direction opposite to the insertion direction is restricted based on the engagement between the protruding portion 21 and the catch surface 37a of the insertion portion 32 of the end cap. Therefore, the end cap 30 can be prevented from coming off from the molding body 10.

In the method according to the present embodiment, the molding body 10 and the end cap 30 are not welded to each other, and thus the molding body 10 and the end cap 30 do not need to be formed of materials having close melting points, and there is little restriction on a selection of materials. In the protruding portion forming process, the molding body 10 is melted and deformed and there is no need to deform the end cap 30, and thus the end cap 30 may not be broken even if the end cap 30 is made of a material which is easy to break (for example, a PBT resin).

By using the ultrasonic horn 40 in which the annular protrusion 42 and the annular recessed portion 43 are formed as shown in (A) of FIG. 6, in the ultrasonic vibration pressing step and the non-vibration pressing step, the tip projecting portion 41 can be stably pushed against the side wall remaining portion 16 of the molding body 10, and compared to a case where the annular recessed portion 43 is not formed, a resistance received by the ultrasonic horn 40 from the molten resin can be reduced. In addition, the amount of molten resin can be reduced by causing the tip projecting portion 41 to vibrate ultrasonically and melting a resin portion where the tip projecting portion 41 contacts, and by receiving and retaining a part of the excessive molten resin in the annular recessed portion 43, it is possible to reduce the amount of molten resin overflowing and raising around the hole portion 22, and prevent or control generation of the raised portion R.

[Modification Example] The present invention is not limited to the embodiment described above, and may be implemented in the following aspects.

For example, in the embodiment described above, the ultrasonic horn 40 in the ultrasonic vibration state is pressed against the facing portion (side wall remaining portion 16) of the molding body 10 to melt the facing portion of the molding body, but the insertion portion 32 of the end cap 30 may be melted using the ultrasonic horn 40.

Figure 8:
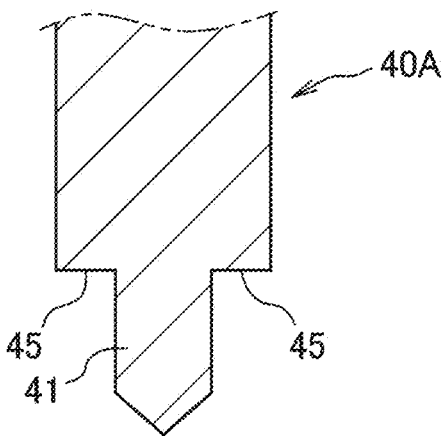
FIG. 8 is a schematic sectional view showing another example of an ultrasonic horn.

In the above embodiment, the ultrasonic horn 40 including the annular recessed portion 43 and the annular protrusion 42 formed on the outer periphery of the tip projecting portion 41 of the ultrasonic horn is used, but instead of this, as shown in FIG. 8, an ultrasonic horn 40A may be used. In the ultrasonic horn 40A, the annular recessed portion 43 and the annular protrusion 42 are not formed on the outer periphery of the tip projecting portion 41, but only an annular flat stepped portion 45 is formed.

In the embodiment described above, the protruding portion 21 is formed at only one location, but the end cap 30 may be firmly fixed to the molding body 10 by forming the protruding portion 21 at two or more locations.

REFERENCE SIGNS LIST

1: door for vehicle
2: door panel
3: belt molding
10: molding body
11: vehicle exterior side wall portion
12: vehicle interior side wall portion
13: top wall portion
16: side wall remaining portion (facing portion, pressed portion by ultrasonic horn)
17: extension portion
18: locked portion
21: protruding portion
22: hole portion at center
30: end cap
31: lid portion
32: insertion portion
32a: vehicle interior side surface of insertion portion
37: catch portion
37a: catch surface
40, 40A: ultrasonic horn
41: tip projecting portion
42: annular protrusion
43: annular recessed portion

The invention claimed is:

1. A belt molding manufacturing method which is a method for manufacturing a belt molding configured to be attached along an upper edge of a door panel of a door for a vehicle, the belt molding comprising a molding body extending in a longitudinal direction and an end cap attached to one end portion of the molding body in the longitudinal direction, at least one of the molding body and the end cap being made of a thermoplastic resin, the method comprising:

preparing the molding body, the molding body comprising a vehicle exterior side wall portion, a vehicle interior side wall portion facing the vehicle exterior side wall portion, and a top wall portion integrally connecting the vehicle exterior side wall portion and the vehicle interior side wall portion, the molding body having an opening end in the longitudinal direction;

preparing the end cap, the end cap comprising a lid portion configured to close the opening end of the molding body, and an insertion portion extending from the lid portion and configured to be inserted between the vehicle exterior side wall portion of the molding body and the vehicle interior side wall portion of the molding body;

inserting the insertion portion of the end cap into the molding body such that the insertion portion of the end cap is disposed to face a facing portion of the molding body, the facing portion being a part of the molding body;

performing an ultrasonic vibration pressing, the ultrasonic vibration pressing comprising pressing an ultrasonic horn in an ultrasonic vibration state against at least one of the facing portion of the molding body and the insertion portion of the end cap, and pushing the ultrasonic horn from a vehicle interior side toward a vehicle exterior side, such that a pressed portion pressed by the ultrasonic horn is melted and deformed to form a hole portion recessed on a pressing surface of the pressed portion and a protruding portion protruding on a surface opposite to the pressing surface;

performing a non-vibration pressing, the non-vibration pressing comprising stopping an ultrasonic vibration of the ultrasonic horn and further moving the ultrasonic horn in a vibration stopped state from the vehicle interior side toward the vehicle exterior side at the pressed portion; and removing the ultrasonic horn from the pressed portion.

2. The belt molding manufacturing method according to claim 1, wherein the insertion portion of the end cap comprises a catch surface provided to intersect with an insertion direction of the end cap, and the facing portion of the molding body is positioned on the vehicle interior side relative to the insertion portion of the end cap, and wherein in the ultrasonic vibration pressing, the protruding portion protruding from the vehicle interior side toward the vehicle exterior side is formed in the molding body by melting and deforming a portion of the facing portion of the molding body on a lid portion side of the end cap relative to the catch surface.

3. The belt molding manufacturing method according to claim 1, wherein a push-in movement amount of the ultrasonic horn in the ultrasonic vibration pressing is larger than a movement amount of the ultrasonic horn in the non-vibration pressing.

4. The belt molding manufacturing method according to claim 1, wherein the ultrasonic horn comprises a tip projecting portion formed at a tip of the ultrasonic horn, an annular recessed portion formed on an outer periphery of the tip projecting portion, and an annular protrusion formed on an outer peripheral edge of the annular recessed portion.

5. The belt molding manufacturing method according to claim 4, wherein in the ultrasonic vibration pressing, the tip projecting portion of the ultrasonic horn ultrasonically vibrates.

* * * * *